March 12, 1940.　　　A. PODEL　　　2,193,113

SEALING MACHINE

Filed March 28, 1938　　　4 Sheets-Sheet 1

INVENTOR
Abraham Podel
BY
Norman N. Holland
ATTORNEY

March 12, 1940.　　A. PODEL　　2,193,113
SEALING MACHINE
Filed March 28, 1938　　4 Sheets-Sheet 2

INVENTOR.
Abraham Podel
BY
ATTORNEY.

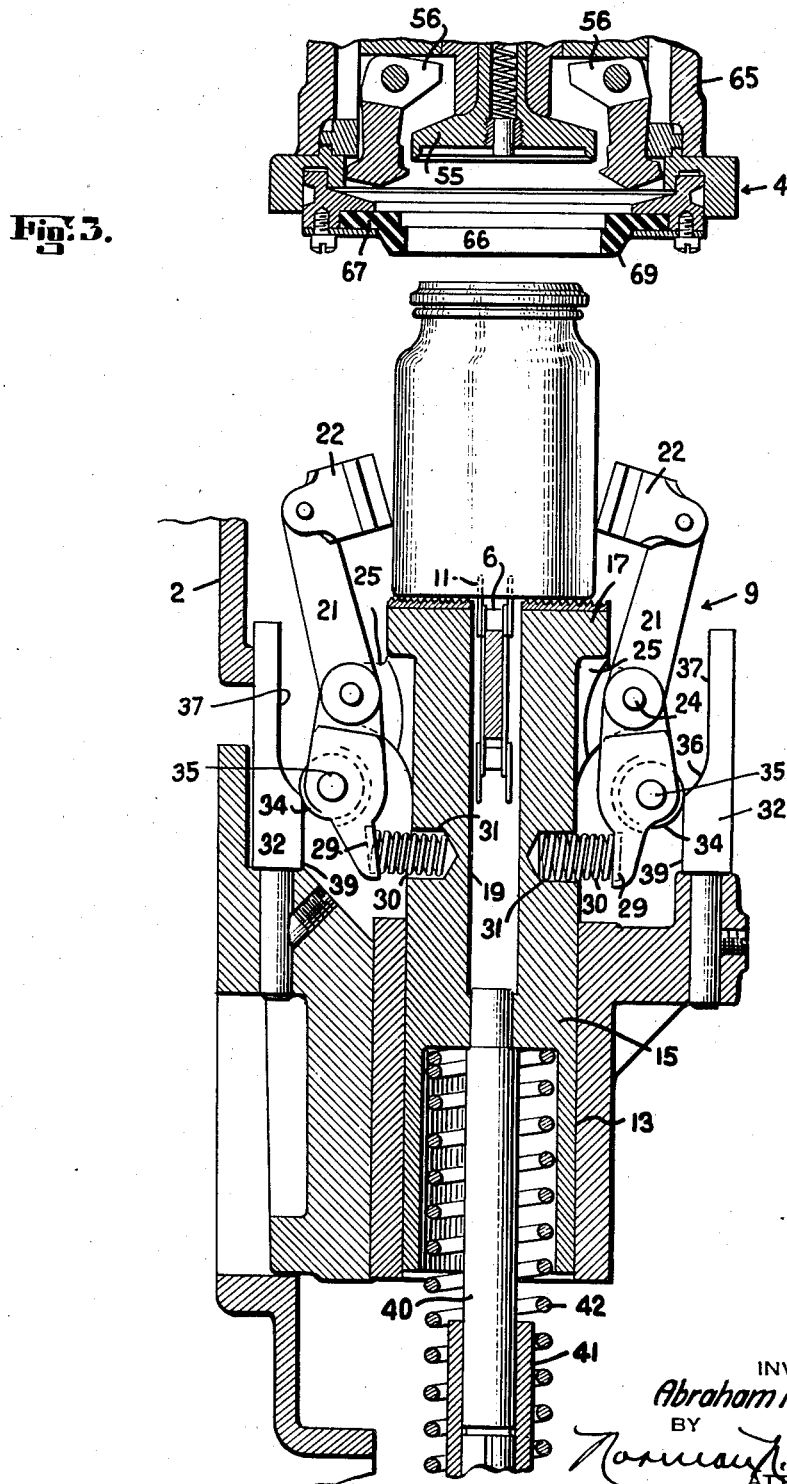

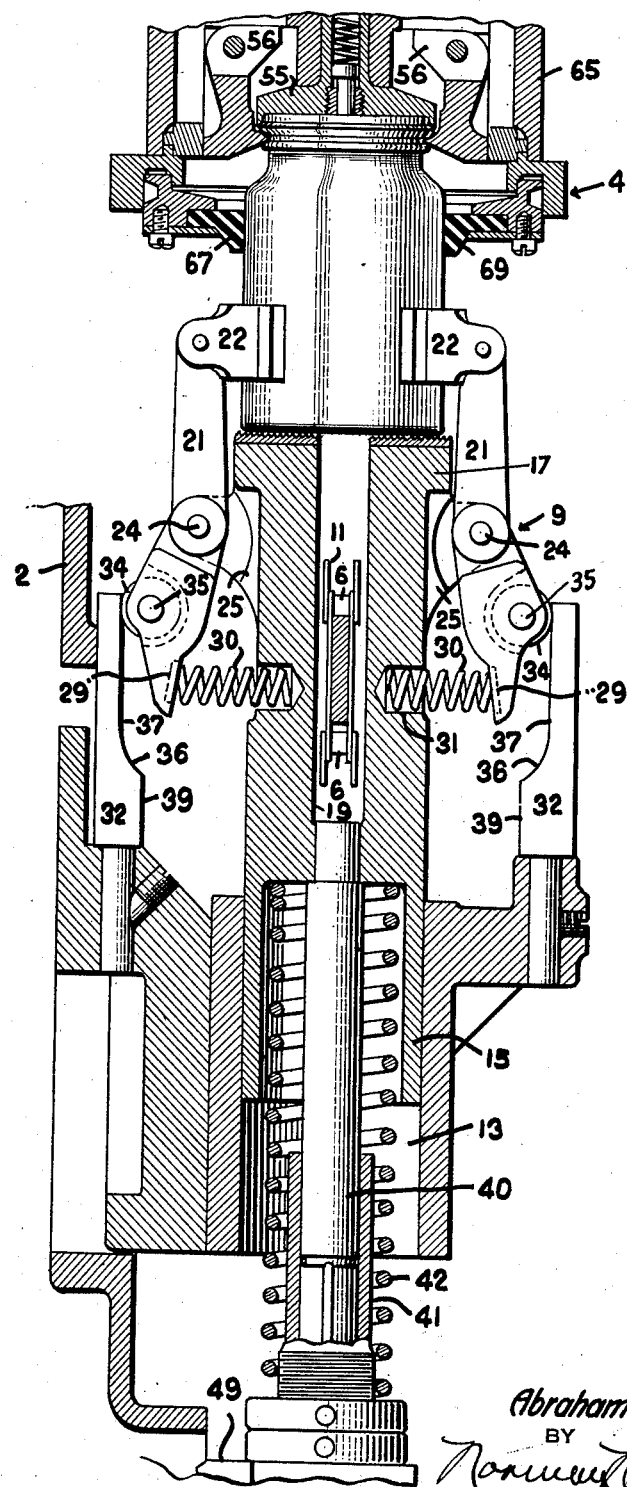

Patented Mar. 12, 1940

2,193,113

UNITED STATES PATENT OFFICE 2,193,113

SEALING MACHINE

Abraham Podel, New York, N. Y., assignor to Anchor Cap & Closure Corporation, Long Island City, N. Y., a corporation of New York Application March 28, 1938, Serial No. 198,454

12 Claims. (Cl. 226—82)

The present invention relates to sealing machines and more particularly to a device for delivering containers to a sealing mechanism adapted to form a hermetic seal and a vacuum seal where desirable.

It is desirable to seal closures to containers rapidly by means of simple, inexpensive sealing machines which do not require manual handling of the packages. To accomplish this, conveyors are utilized which deliver the containers automatically to a sealing mechanism and thereafter remove the sealed packages therefrom. With certain types of closures, it is necessary to stop the lateral movement of the containers with respect to the sealing heads during the sealing operation. In such cases, the conveyor is moved intermittently, that is, the conveyor is stopped when a container is under the sealing mechanism and is started again after the closure is secured to the container. Usually, the conveyors are stopped and started rather suddenly to increase the speed and sealing capacity of the machine.

One of the difficulties encountered with conveyors of the above type is that the sudden starting and stopping of the conveyor causes the filled containers to topple or fall and break. Also, the rapid stopping and starting of the conveyor causes the product within the containers to splash or spill on the conveyor. Where the conveyor is stopped, all the containers thereon are stopped and each container may be stopped and started several times depending on the length of the conveyor. Attempts have been made to overcome the above difficulties by providing machines having continuously moving conveyors, but these attempts have not been successful because such machines could not seal all types of closures and usually were too expensive and complicated.

The present invention aims to eliminate or minimize the above difficulties by providing a simple, inexpensive sealing machine, a continuously moving conveyor for delivering containers to the sealing machine, and a table or platform adapted to stop and to raise the containers from the conveyor and present them to the sealing machine. The invention further aims to provide a container raising platform having pivotally mounted gripping arms or fingers which move upwardly and downwardly with the table and move inwardly and outwardly with respect to the containers to grip and center them with respect to the sealing mechanism.

An object of the present invention is to increase the speed of sealing caps to containers.

Another object of the invention is to eliminate or minimize breakage of the containers or spilling the product without decreasing the speed or sealing capacity of the machine.

Another object of the invention is to provide a continuously moving conveyor for delivering containers to a sealing mechanism and a device for raising the containers from the conveyor for the sealing operation without interfering with the continuous movement of the conveyor.

Another object of the invention is to provide a container raising device carrying gripping arms which move upwardly and downwardly with the container raising device whereby there is no relative vertical movement between the arms and the containers.

Another object of the invention is to provide an effective container gripping device carried by the container raising device adapted to resiliently grip and center the containers with respect to the sealing tools of the sealing mechanism.

Another object of the invention is to provide a container gripping device carried by the container raising device adapted to be operated automatically during the upward and downward movement of the container raising device.

Another object of the invention is to provide a continuously moving conveyor and a container raising device for presenting the containers to a sealing chuck adapted to reform the skirt of the closure.

A further object of the invention is to provide a sealing machine embodying the above advantageous features which is adapted to seal the closures while the container is subjected to a vacuum.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a front elevational view illustrating a preferred embodiment of a sealing machine embodying the present invention;

Fig. 3 is an enlarged sectional view illustrating a preferred embodiment of a container raising device in its lower position; and Fig. 4 is an enlarged sectional view illustrating the container raising device in its upper position and with the sealing mechanism applying the cap to the container.

Figure 1:
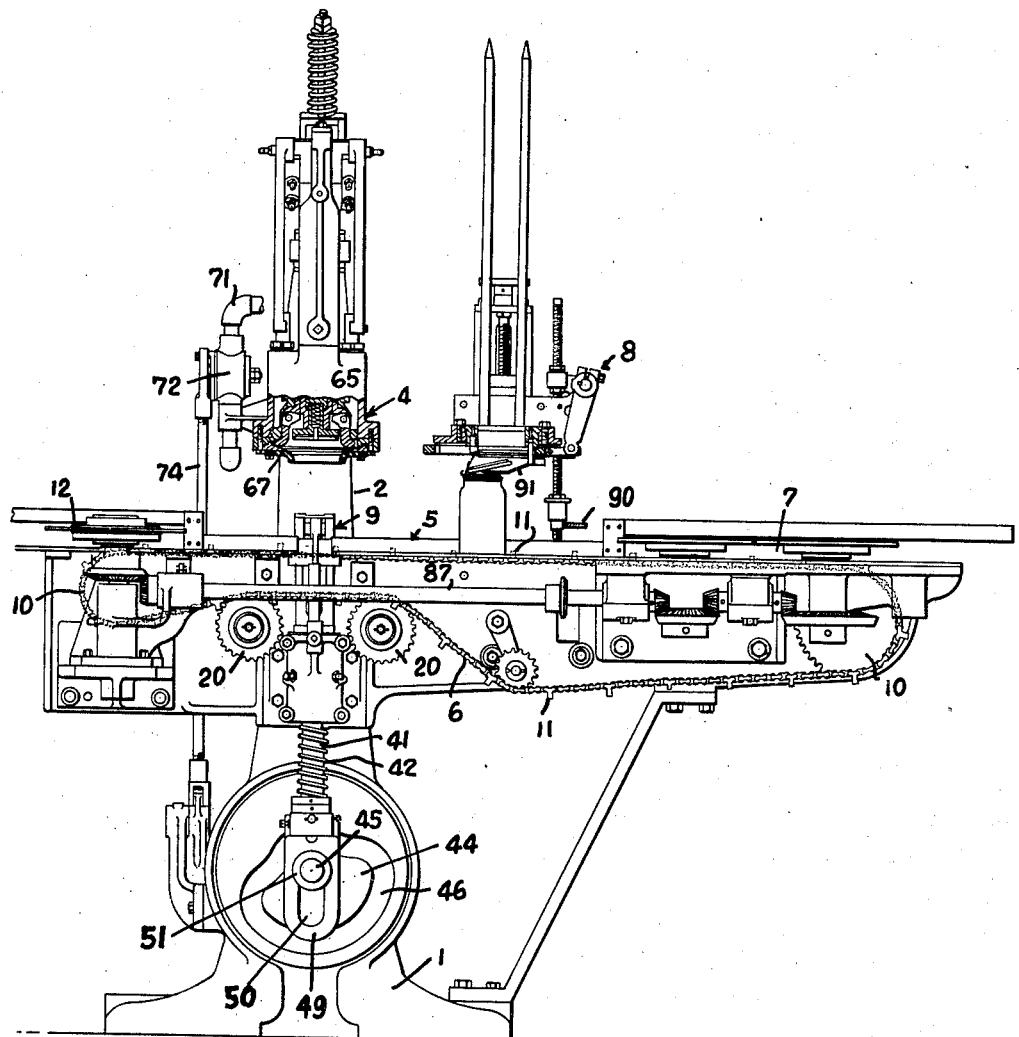
Figure 2:
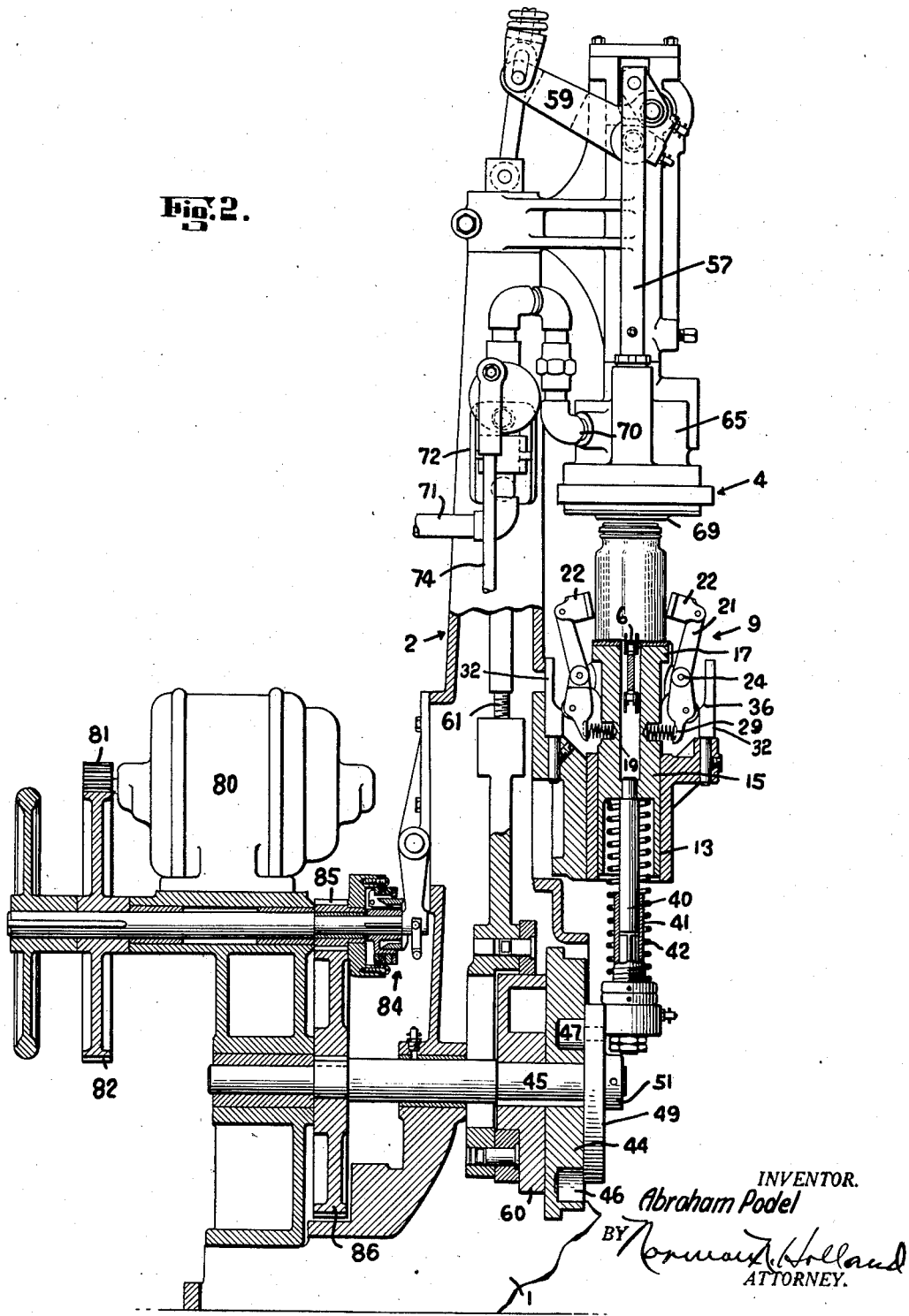
Fig. 2 is a side elevational view, partly in section, of the machine shown in Fig. 1.

Referring again to the drawings and more particularly to Figs. 1 and 2, there is shown a sealing machine comprising a base 1 having an upright column 2 for supporting a sealing mechanism 4, a table or runway 5 for an endless conveyor 6, a device 7 for placing containers on the conveyor runway in spaced relation, a cap feeding device 8 mounted on the table, and a container gripping and raising device 9 for presenting the containers to the sealing mechanism.

The conveyor, as illustrated herein, preferably is of the chain type and is mounted on suitable sprockets 10 at each end of the table which are adapted to be rotated by a suitable drive mechanism described hereinafter. The conveyor or chain 6 has a series of spaced projecting cleats 11 which engage the containers as they are placed on the table by the spacing device 7 and advance the containers along the table or runway.

Preferably, the containers are placed on the table filled with the product to be packed therein and are supplied with caps as they pass the cap feeding device 8. The cap feeding device may be similar to the device illustrated in my prior patent, No. 1,964,078, dated June 26, 1934, although other feeding devices may be utilized or the caps may be applied by hand.

After caps have been placed loosely on the containers, the containers are conveyed to the raising device. The purpose of the container raising device is to raise the containers from the conveyor without stopping the movement of the conveyor so that the sealing mechanism may secure the caps to the containers. After the sealing operation is completed, the containers are lowered and are again engaged by the cleats of the chain and are moved to a takeoff station or disc 12 at the other end of the table. By utilizing the container raising device, the conveyor can be moved continuously thus eliminating complicated intermittent drive means.

A preferred container raising device is illustrated in detail more particularly in Figs. 3 and 4 and comprises a plunger 15 seated in a suitable bore or aperture 13 on the table 5, and a suitable device, described hereafter, for vertically reciprocating the plunger. The plunger preferably is substantially cylindrical and has a substantially circular table portion or platform 17 at the upper end thereof which is flush with the surface of the table or runway 5 when the plunger is in its lower position, and is adapted to receive and support a container delivered by the conveyor. In order to enable the conveyor chain to place containers on the table portion, the plunger has a slot 19 in alignment with the conveyor which extends from the upper surface of the table portion 17 downwardly to the lower portion of the plunger. This slot is of sufficient width to receive the conveyor chain and of sufficient depth to permit the chain to pass therethrough while the plunger is in its raised position. Preferably, both the upper and lower strands of the chain extend through the slot to permit the raising and lowering mechanism to be placed directly beneath the plunger. As illustrated more particularly in Fig. 1, the lower strand is supported substantially adjacent the upper strand by a pair of sprockets 20 to enable it to pass through the slot.

A suitable device for gripping the containers while they are on the table portion preferably is mounted on the plunger. Such a device serves to prevent accidental movement of the containers as they are being raised and at the same time serves to center the containers with respect to the table portion and the sealing mechanism. In addition, the gripping means prevent the containers from toppling while being raised or lowered.

The gripping device preferably comprises a pair of arms or lever members 21 each having a jaw 22 at the upper end for engaging opposite sides of a container to clamp it in position. The lever members are pivotally mounted by suitable pins or shafts 24 extending through ears or lugs 25 at the upper portion of the plunger 15. By mounting the gripping arms on the plunger, they move upwardly and downwardly with the container without relative movement between the arms and the container tending to disturb or upset the container. If desired, the gripping faces of the jaws may be padded to prevent the containers from being damaged.

The arms or lever members 21 preferably are oscillated into and out of gripping relation by a suitable spring and cam device. This may be accomplished by providing the lower end of each lever with a recess 29 for receiving one end of a spring 30 having its other end seated in a recess 31 in the plunger 15. The springs 30 normally tend to move the lower ends of the levers outwardly so that the upper ends of the levers carrying the jaws 22 move inwardly to grip the container.

In order to hold the gripping jaws apart while the table portion 17 is in its lower position, a cam member 32 is mounted on the runway 5 adjacent each of the levers, which is adapted to be engaged by a roller 34 mounted on the lever at 35. The cam members 32 preferably have outwardly and upwardly diverging cam portions 36 for permitting the springs 30 to move the levers into container gripping position when the plunger is raised and for causing the levers to move out of gripping relation, in opposition to the springs 30, when the plunger is lowered. A substantially straight vertical portion 37 is provided above each cam portions 36 which is engaged by the roller on each lever to permit the jaws to extend inwardly in gripping relation with the container during the upward or downward movement of the table portion 17. Likewise, below the cam portions 36 a substantially straight vertical portion 39 is provided for engaging the rollers and causing the levers to be held in open position to receive or release a container when the table is in its lower position.

The gripping device is positive in operation because the springs normally urge the levers into gripping relation. It can readily accommodate containers varying slightly in diameter and will grip the containers with sufficient tightness but not too tightly. The plunger can be readily replaced by other plungers carrying levers or jaws for engaging containers of other diameters or shapes. Another feature of the gripping device is that the inward movement of the jaws is accurately controlled by the straight portions 37 so that each jaw extends inwardly the same distance and centers the container with respect to the sealing mechanism.

The device for raising and lowering the plunger 15 may comprise a connecting rod 40 secured to the lower end of the plunger, a sleeve 41 for slidably receiving the rod, and a spring 42 extending lengthwise about the rod and sleeve to provide a resilient mounting for the plunger. The rod and sleeve are adapted to be raised and lowered by a cam member 44, mounted on a rotatable drive shaft 45, having a cam dwell or recess 46 for receiving a cam roller 47 connected to the lower end of the sleeve 41. In order to reciprocate the rod and sleeve vertically, a yoke 49 is connected to the sleeve 41 which has a slot 50 for receiving the end of the shaft 45 and is connected to the shaft by a collar 51 (Fig. 1).

The sealing mechanism illustrated herein may be similar to the mechanism illustrated in my prior Patent No. 1,841,051, dated January 12, 1932, and is particularly adapted to seal closure caps of the type shown in the patent and in Figs. 3 and 4 of the present drawings. Such closures have a bead containing a gasket, which is reformed to compress the gasket against the side wall of a container. While this form of closure is illustrated herein, it will be understood that other forms of closures and sealing mechanisms for securing them to the containers could be used instead, without departing from the spirit of the invention. Such sealing machines could be of the type for applying crimped caps, caps which require only top pressure, screw caps, and can heads or tops which are seamed by suitable rollers.

Generally described, the sealing mechanism comprises an anvil member 55 adapted to engage the top of the cap (Fig. 4) and a collapsible chuck having a series of jaw segments 56 adapted to be moved under the bead of the cap. The chuck segments and anvil are operatively connected to rods 57 reciprocated by a bell crank 59 which is operatively connected to a cam 60 on the shaft 45 by a rod 61. When the container is raised into engagement with the anvil, the chuck segments are moved under the bead of the cap and the anvil and chuck jaws move toward each other to constrict the bead and seal the cap. Since the plunger is resiliently mounted on the raising and lowering mechanism by the spring 42, the container will not be subjected to any shock when the cap comes in contact with the anvil. Also, the container is free to move slightly downwardly while the bead is being constricted. As customary, the sealing mechanism may be adjustably mounted on the support or column 2 to permit it to be raised and lowered to accommodate containers of different heights.

If it is desired to seal the containers under a vacuum, a suitable hood or chamber 65 may be placed about the chuck and anvil. The chamber preferably has a circular opening 66 at the bottom thereof adapted to receive the upper portion of the container when it is raised by the plunger or table to present the cap to the sealing tools. In order to close the bottom opening of the chamber while the cap is being secured, an annular gasket or packing ring 67 is attached to the inner periphery of the opening, and the gasket has a flange 69 for engaging the shoulder or side wall of the container to seal the opening (Fig. 4). A vacuum may be created by connecting the chamber to a vacuum supply line 71 through a valve 72 periodically operated by a rod 74, operated by a cam surface (not shown) on the outer periphery of the cam member 44. Such a valve operating device is shown in detail in my prior patent, No. 1,841,051.

A suitable drive for operating the various mechanisms in timed relation may comprise a motor 80 or other suitable source of power, gears 81 and 82, a clutch 84 and gears 85 and 86 for rotating the shaft 45. The cams 44 and 60 are mounted in predetermined circumferential relation on the shaft 45 to operate the container raising device, the vacuum supply valve and the sealing mechanism at desired intervals. The cap feeding device 8 and a conveyor drive shaft 87 (Fig. 1) may also be operatively connected to the drive shaft 45 in any suitable manner. Preferably, the conveyor drive shaft 87 also operates the infeed spacer and the rotating takeoff table 12.

Before operating the machine, the height of the sealing head and cap feed are adjusted to accommodate the container to be sealed and the conveyor chain is adjusted so that a container is placed on the table portion 17 just as the plunger is about to be raised. The infeed spacer and takeoff table are then coordinated with the cleats of the chain and the cams for the sealing mechanism and vacuum valve are adjusted to operate in timed relation with the container raising table.

In the operation of the machine, the infeed spacer 7 places containers on the conveyor table at predetermined intervals so that the containers are engaged by the cleats 11 of the chain 6 and are moved along the runway in spaced relation. As a container approaches the cap feeding device, it contacts a lever 90 (Fig. 1) which causes the cap feeding device to be operated to place a cap on the support 91. As the containers pass under the cap feeding device, the upper end thereof engages the interior of the skirt of the cap and pulls the cap from the support into loosely seated position on the mouth of the container (Fig. 1). When the container reaches the table portion 17, the cam 44 is effective to raise the plunger and present the upper portion of the container to the sealing tools, while the lower portion of the container is gripped and centered by the jaws 22 (Fig. 4). If a vacuum seal is desired, the shoulder of the container fits against the flange 69 of the sealing ring 67 and vacuum is created in the chamber to exhaust the air from the container while the sealing mechanism is operated to secure the cap. While the container is being raised and lowered, the conveyor chain 6 and cleats 11 move continuously through the slot 19 in the plunger. After the cap has been sealed, the plunger is lowered so that the table portion 17 is flush with the conveyor table 5 and a succeeding cleat of the conveyor engages the container and transfers the container to the takeoff table 12. As soon as the container has been removed from the table portion, a succeeding container is placed thereon and is presented to the sealing machine in a similar manner.

It will be seen that the present invention provides a simple, inexpensive sealing machine which is continuous in operation and does not utilize any intermittent drive means. Since the containers are moved continuously by the conveyor, they will not topple or spill the product due to sudden stopping or starting. The conveyor and the container raising device can be readily operated in timed relation with the sealing machine at a relatively high rate of speed to materially increase the sealing capacity of the machine. Another feature is that the gripping device is carried by the table portion or raising plunger and does not move vertically with respect to the container during upward or downward movement. This permits the gripping device to clamp the container more tightly and center it more accurately with respect to the sealing mechanism. The device illustrated herein is adapted to be used in connection with various types of sealing machines to attain the above advantages. The parts of the present device are rugged in construction and can readily withstand any rough usage to which they may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a sealing machine the combination of a sealing mechanism, a table extending beneath said sealing mechanism, a conveyor on said table for delivering containers to said sealing mechanism, means beneath said sealing mechanism for receiving and supporting the container, means for raising said supporting means to present the containers to said sealing mechanism, gripping means pivotally mounted on said supporting means for engaging the containers, and cam means on said table for holding said gripping means out of container engaging position when said supporting means is in its lower position.

2. In a sealing machine, the combination of a sealing mechanism, a platform beneath said sealing mechanism adapted to support a container, means for raising and lowering said platform, a pair of pivotally mounted members carried by said platform each having a container engaging portion at one end thereof and a roller substantially at the other end thereof, and a stationary cam adjacent each roller adapted to move said arms out of container engaging position when said platform is moved to its lower position.

3. In a sealing machine, the combination of a sealing mechanism, a platform beneath said sealing mechanism adapted to support a container, means for raising and lowering said platform, a pair of pivotally mounted members carried by said platform each having a container engaging portion at one end thereof and a roller at substantially the other end thereof, a stationary cam adjacent each roller adapted to move said arms out of container engaging position when said platform is moved to its lower position, and springs carried by said platform each engaging one of said arms to move said arms into container engaging position when said platform is raised.

4. In a sealing machine, the combination of a sealing mechanism, a table beneath said sealing mechanism adapted to be raised to present a container to said sealing mechanism, said table having a slot therein, a continuously moving conveyor for delivering containers to said table extending through the slot of said table, a pair of pivotally mounted arms carried by said table for engaging and holding the containers, cam means for opening and closing said arms and means for raising said table and operating said sealing mechanism in timed relation with the raising of said table.

5. In a sealing machine, the combination of a sealing mechanism, a chamber extending about said sealing mechanism having an opening in the bottom thereof for receiving a container, means for connecting said chamber to a source of vacuum, means beneath said sealing mechanism for raising a container into said chamber, a continuously moving conveyor for delivering the containers to said raising means, pivotally mounted gripping means on said raising means for engaging and centering the container with respect to said sealing mechanism, and cam means for engaging and releasing said gripping means.

6. In a sealing machine, the combination of a sealing head, a vacuum chamber extending about said sealing head, a platform beneath said sealing head adapted to support a container, said platform having a slot therein, a conveyor extending through said slot for delivering containers to said platform, means for raising said platform to move the upper portion of the container into the chamber, a vacuum conduit rendered effective while said container is in raised position, means for operating said sealing head while said vacuum conduit is effective, pivotally mounted gripping means carried by said platform adapted to grip and center the containers with respect to said sealing head, and cam means adapted to open and close said gripping means about the container.

7. In a sealing machine the combination of a sealing head, a vacuum chamber extending about said sealing head, a platform beneath said sealing head adapted to support a container, said platform having a slot therein, a conveyor extending through said slot for delivering containers to said platform, means for raising said platform to move the upper portion of the container into the chamber, a vacuum conduit rendered effective while said container is in raised position, means for operating said sealing head while said vacuum conduit is effective, pivotally mounted gripping means carried by said platform adapted to grip and center the containers with respect to said sealing head, resilient means for moving said gripping means into container engaging position, and cam means for moving said gripping means out of container engaging position.

8. In a sealing machine, the combination of a sealing mechanism, a continuously moving conveyor for delivering containers to said sealing mechanism, a platform beneath said sealing mechanism for supporting the containers, a container raising member carried by said platform and movable with respect thereto, means for raising and lowering said container raising member with respect to said platform, and a pair of pivotally mounted arms carried by said container raising member, resilient means carried by said container raising member for moving said arms into container gripping position when said container raising member is raised, and positive means for moving said arms out of container gripping position when said container raising member is lowered.

9. In a sealing machine, the combination of a sealing mechanism, a conveyor for delivering containers to said sealing mechanism, a platform beneath said sealing mechanism for supporting the containers, and having a movable part for raising and lowering the containers, means for raising and lowering said movable part of the platform with respect to said conveyor, and pivotally mounted arms carried by the movable part of the platform, resilient means carried by said arms and the movable part of the platform for moving said arms into container gripping position when said movable part is raised, and stationery cam means on said platform adjacent said arms for moving said arms out of gripping position when said movable part is lowered.

10. In a sealing machine, the combination of a sealing mechanism, a platform beneath said sealing mechanism, adapted to support a container, a member mounted on said platform vertically movable with respect thereto for raising a container into sealing position, means for raising and lowering said vertically movable member, a pair of pivotally mounted members carried by said vertically movable member, each having a container engaging portion at one end thereof and a roller at the other end thereof, and a stationary cam mounted on said platform adjacent each roller adapted to move said arms out of container engaging position when said vertically movable member is moved to its lower position.

11. In a sealing machine, the combination of a sealing mechanism, a platform beneath said sealing mechanism adapted to support a container, a member mounted on said platform and vertically movable with respect thereto for raising a container into sealing position, means for raising and lowering said vertically movable member, a pair of pivotally mounted members carried by said vertically movable member, each having a container engaging portion at one end and a roller at substantially the other end thereof, a stationary cam adjacent each roller adapted to move said arms out of container engaging position when said vertically movable member is moved to its lower position, and springs effective upon said arms to move said arms into container engaging position when said platform is raised.

12. In a sealing machine, the combination of a sealing mechanism, a table beneath said sealing mechanism adapted to be raised to present a container to said sealing mechanism and having a downwardly extending column portion with a substantially vertical slot therein, an endless conveyor for delivering containers to said table having upper and lower strands extending through the slot of said column portion, means for holding the lower strand of the conveyor in close proximity to the upper strand at said table to permit greater upward movement of the table, a rod connecting the column portion with a sleeve, a sleeve for receiving the lower part of said rod, means resiliently supporting said rod in said sleeve to provide a resilient mounting for said table, and means beneath the lower conveyor strand for raising said table without interfering with the operation of the conveyor.

ABRAHAM PODEL.